R. X. LANDOLL.
CIRCULAR SAW MACHINE.
APPLICATION FILED NOV. 29, 1915.

1,269,288.

Patented June 11, 1918.
5 SHEETS—SHEET 1.

INVENTOR
Rupert X. Landoll

WITNESSES

BY
ATTORNEY

R. X. LANDOLL.
CIRCULAR SAW MACHINE.
APPLICATION FILED NOV. 29, 1915.

1,269,288.

Patented June 11, 1918.
5 SHEETS—SHEET 2.

INVENTOR
Rupert X. Landoll.

WITNESSES

BY Richard B. Owen,
ATTORNEY

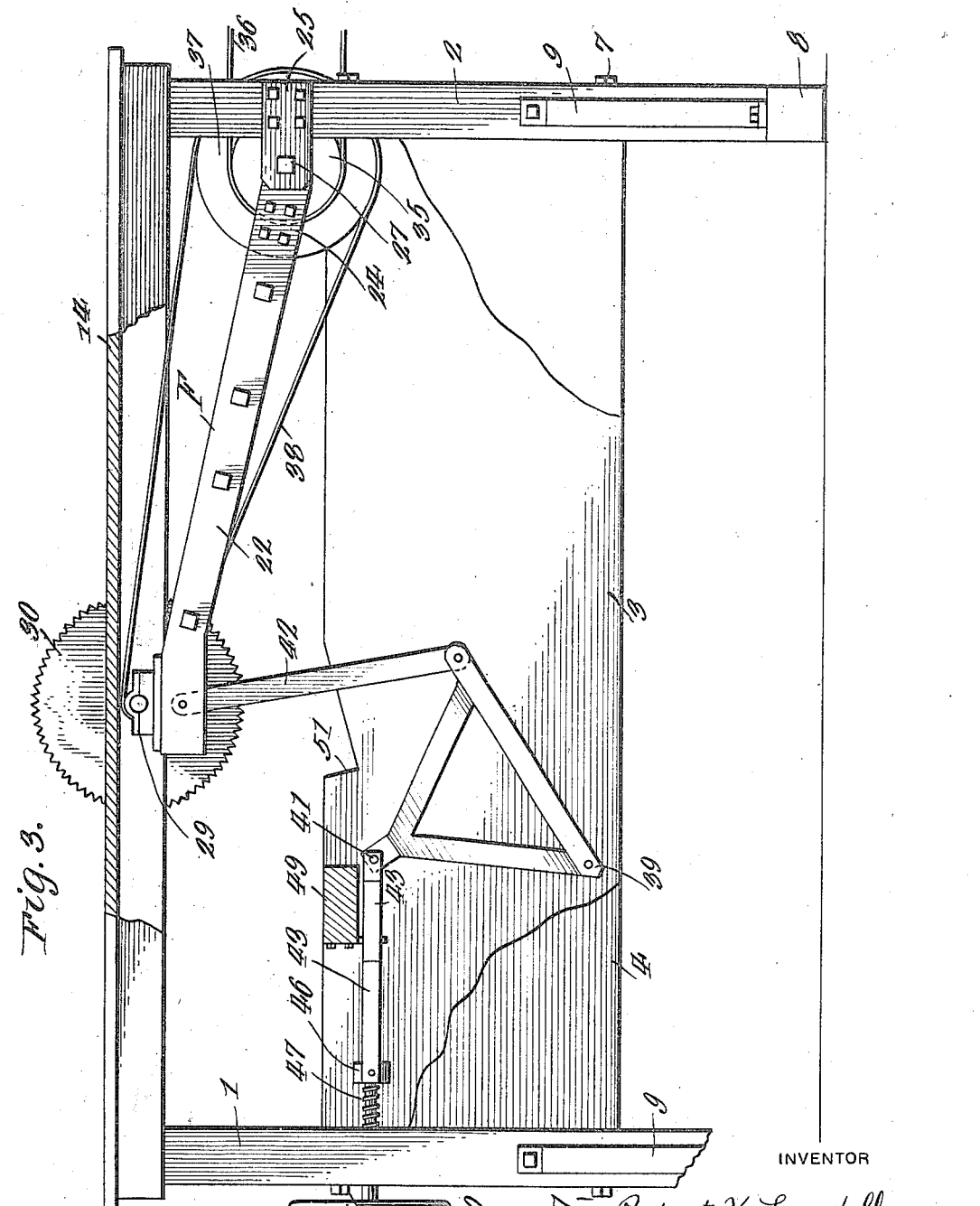

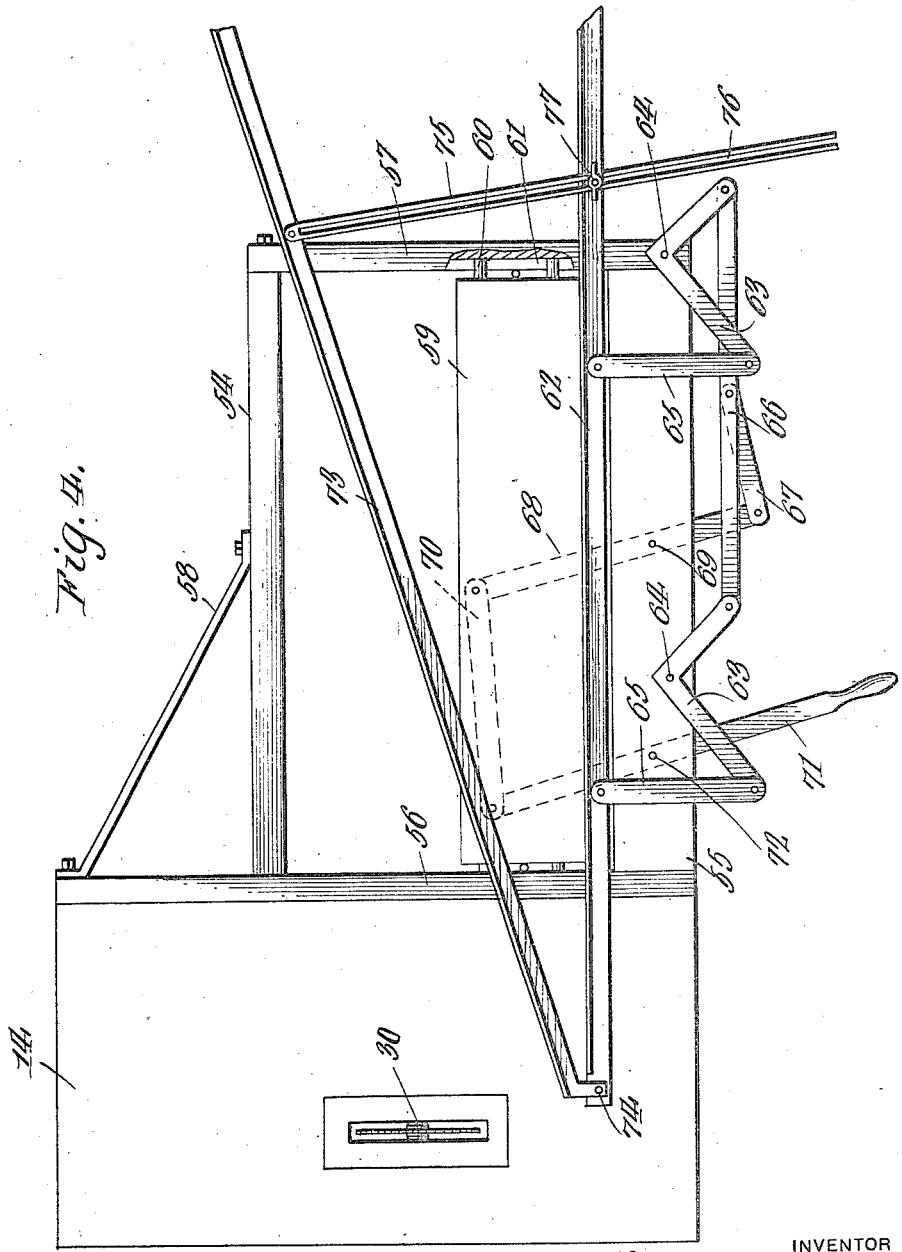

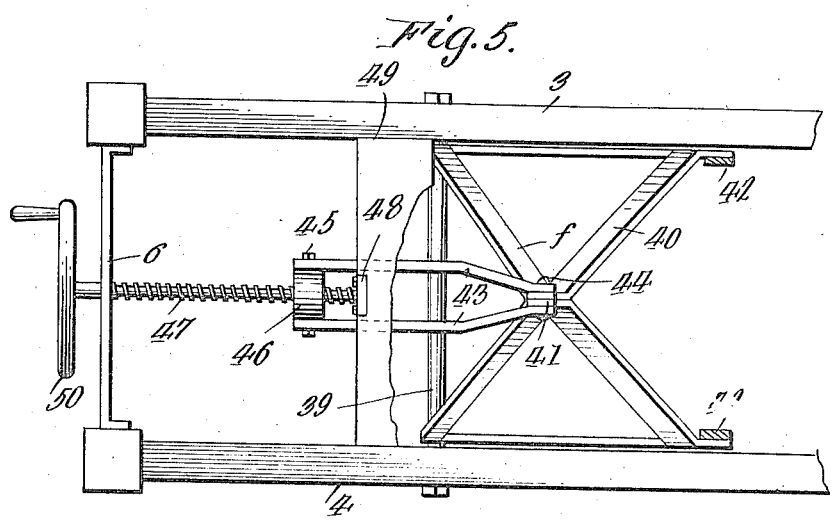
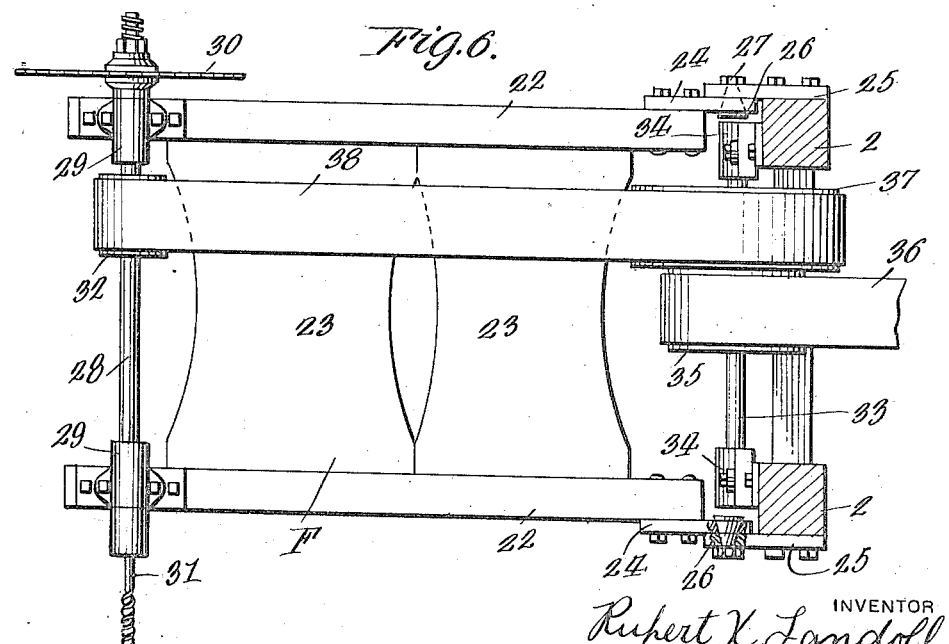

UNITED STATES PATENT OFFICE.

RUPERT X. LANDOLL, OF CARTHAGENA, OHIO.

CIRCULAR-SAW MACHINE.

1,269,288.  Specification of Letters Patent.  Patented June 11, 1918.

Application filed November 29, 1915. Serial No. 64,114.

*To all whom it may concern:*

Be it known that I, RUPERT X. LANDOLL, a citizen of the United States, residing at Carthagena, in the county of Mercer and State of Ohio, have invented certain new and useful Improvements in Circular-Saw Machines, of which the following is a specification.

The primary object of my invention is to provide a saw machine of the character above mentioned having improved means for supporting, manipulating and driving a circular saw, whereby to facilitate wood cutting or metal cutting as the case may be and to increase the efficiency of such a machine.

A further object of my invention is to provide an improved work supporting platform for use in connection with my improved sawing machine.

A still further object of my invention is to provide an improved gage and work feeding mechanism for use in connection with my improved sawing machine.

A still further object of my invention is to provide a boring attachment, the boring attachment being carried by the saw frame and adjusted by the movement of said frame.

A still further object of my invention is to embody in a simple, cheap, strong and durable structure the features mentioned in the foregoing, whereby a device is produced which reduces labor and is cheap to manufacture.

With the above and other objects in view my invention resides preferably in the construction, combination and arrangement of parts as hereinafter set forth in the specification and illustrated in the accompanying drawings, in which:

Fig. 3 is a side elevational view, partly broken away and in section showing my improved sawing machine.

Fig. 4 is a top plan view of a cut-off gage attachment and work feeding mechanism for use in connection with my improved sawing machine.

Fig. 5 is a fragmentary top plan view of a portion of the controlling mechanism for the saw, and Fig. 6 is a similar view of the saw carriage and driving mechanism for the saw.

Similar reference characters designate corresponding parts throughout the various views of the drawings.

Figure 1:
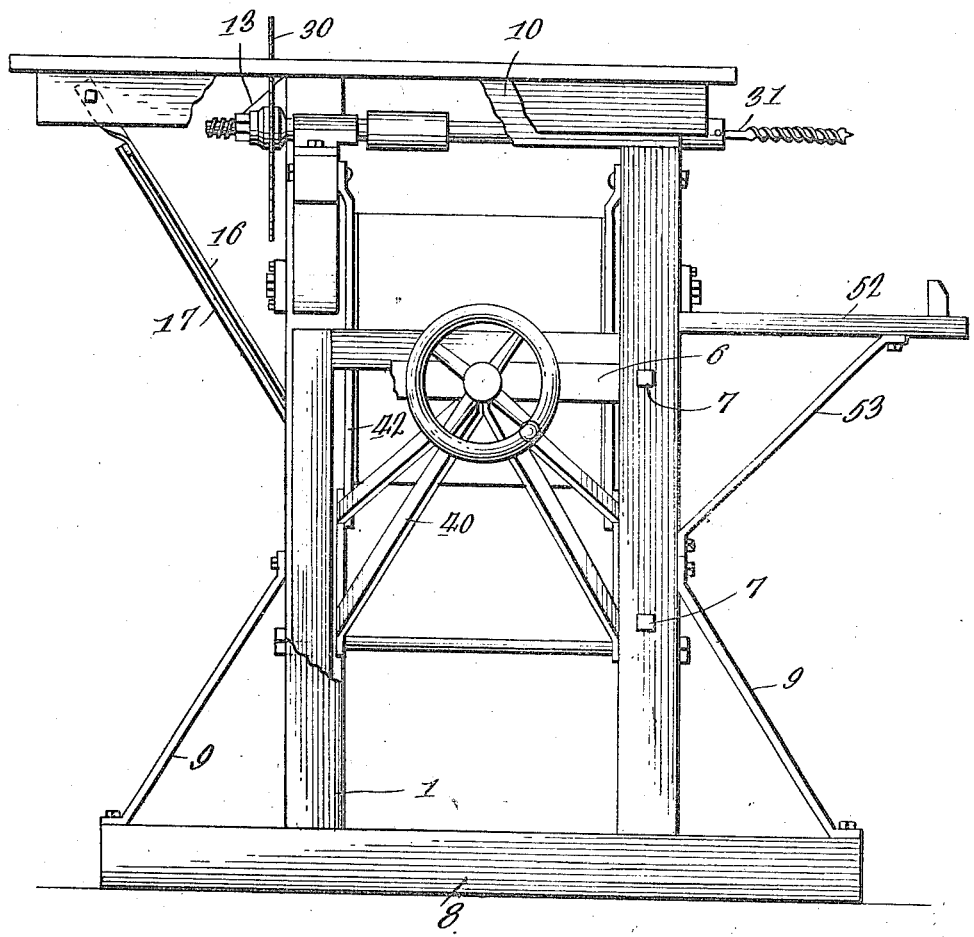
Figure 1 is a front end elevational view of my improved sawing machine.
Figure 2:
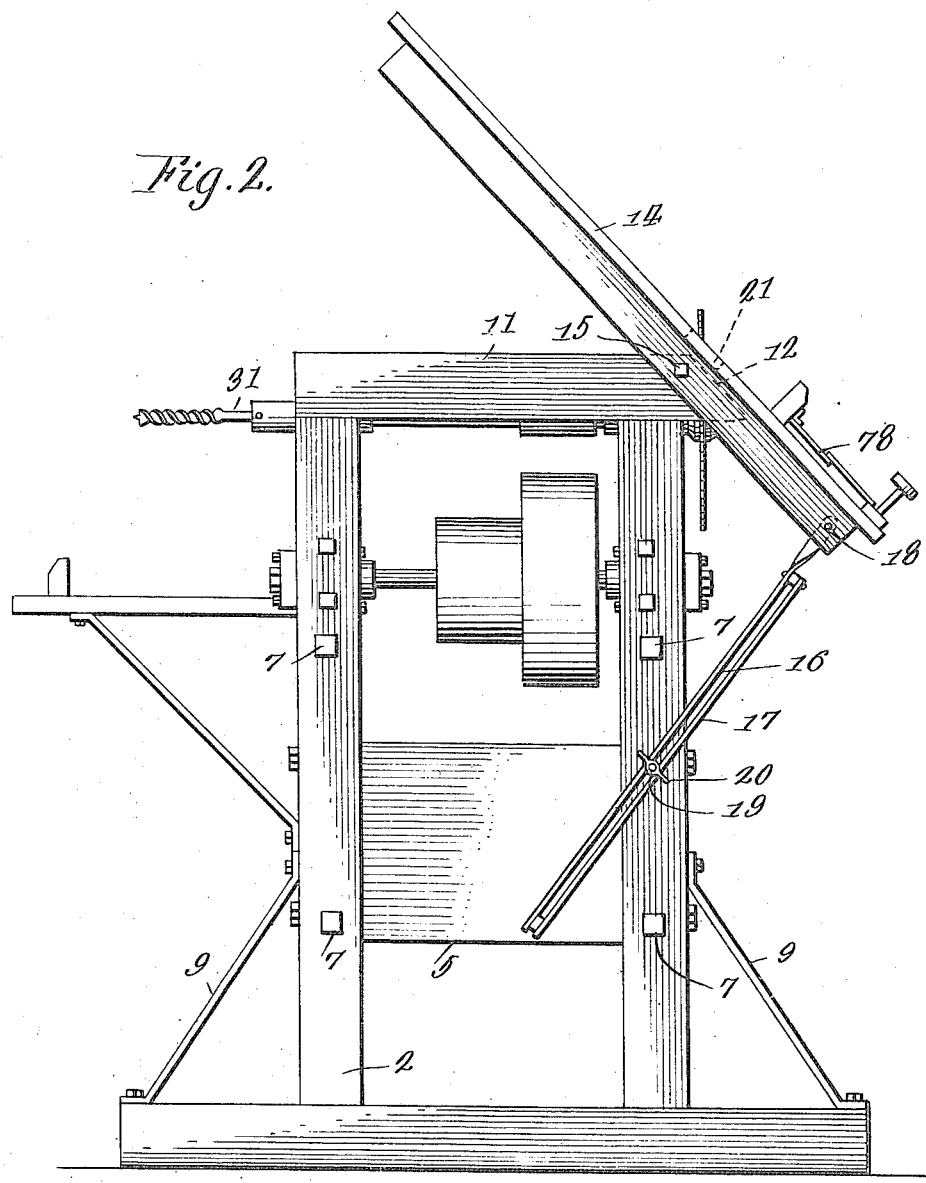
Fig. 2 is a rear end elevational view of the same, showing the work table or platform angularly arranged.

In the drawings, wherein the preferred embodiment of my invention is illustrated, I provide a supporting frame comprising vertical front and rear standards 1 and 2, respectively. The standards are connected by means of longitudinally extending panels 3 and 4, an end panel 5 and a transverse beam 6. The standards 1 and 2 and panels 3 and 4 may be securely connected by means of bolts 7 or the like. Feet are provided for the supporting frame and comprise beams 8 connecting the lower ends of the standards 1 and 2 and being strengthened by braces 9. Transverse stringers 10 and 11 connect the upper extremities of the standards 1 and 2, respectively, said stringers being extended beyond one side of the frame and having their extremities beveled, as indicated at 12 and 13, to form movement limiting shoulders for the work platform 14 which is hinged, at 15, to said stringers. The platform 14 is adjusted by means of a bar 16, said bar 16 having a second bar 17 in parallel spaced relation thereto, the first mentioned bar being connected, at 18, to one side of the table or platform 14. A bolt 19 is receivable between the bars 16 and 17 and a wing nut 20 serves to lock the adjusting bars in a desired position. The platform 14 is provided with an aperture 21 through which the saw hereinafter described projects to perform a cutting operation.

The saw carrying member comprises a frame F including stringers 22 connected by transversely extending panels 23. The frame F is pivoted on the rear standards 2 by means of plates 24 carried by the inner extremities thereof, said plates being in pivotal engagement with stationary plates 25 bolted or otherwise secured on the standards 2 by means of tapered bolts or bearing members 26 which engage in alining apertures in said plates 24 and 25. The apertures necessarily must be tapered, this arrangement providing for wear to the pivot joint when in use so as to prevent rattling, it only being necessary to tighten the nuts 27 of the bolts 26 to take up any wear which may result from the use of the device. The saw shaft 28 is carried in bearings 29 mounted adjacent to the free extremities of the stringers 22, and a circular saw 30 is carried by one extremity of said shaft. A boring tool such as a drill 31 is carried by the opposite extremity of the shaft 28 and operates in a manner hereinafter described. A pulley 32 or the like is mounted on the shaft 28 for a purpose which will hereinafter appear. A driving shaft 33 is mounted in bearings 34 substantially concentric with the pivot bolts 26, said shaft 33 having a pulley 35 or the like mounted thereon and rotatable therewith. A belt 36 is trained over the pulleys 35 and may be connected to any source of power desired. A relatively large driving pulley 37 is mounted on the shaft 33 and rotatable therewith and a belt 38 is trained about the pulleys 32 and 37 whereby power delivered to the shaft 33 will be transmitted to the shaft 28 to drive the saw.

I have provided improved means for manipulating the saw carriage, that is, for moving the saw into and out of operative or cutting position. This mechanism is shown to advantage in Figs. 3 and 5 and includes preferably a shaft 39 carried in the panels 3 and 4 and having a pyramidal frame $f$ including a pair of triangular side frames 40. The side frames 40 are connected at the point 41 at one of their respective vertices. The triangular frames 40 diverge from the point 41 and the other vertices thereof are journaled on the shaft 39 and connected by means of bars 42 to the stringers 22 of the saw carrying frame F. A pair of connecting links 43 are pivotally connected to the frame $f$ by means of a bolt 44 or the like. The opposite extremities of the links 43 are pivotally connected, at 45, to an internally threaded collar 46 operable upon a worm 47. The worm 47 is mounted in the transverse brace 6 and in a bearing 48 carried by a transverse stringer 49. A hand wheel 50 for rotating the worm 47 is carried by the outer free extremity thereof. It will be noted from an inspection of Fig. 3 that the free extremities of the stringers 22 of the saw frame F are provided with an angularly arranged portion, so that the saw bearings will be substantially level when the saw is moved into operating position. A pair of recesses, one of the same being shown in Fig. 3, and designated 51, may be provided in the panels 3 and 4 to receive the extremities of the saw frame when out of operative position. In Fig. 3 the saw is shown in operative position, and it will be readily apparent that when the worm 47 is rotated in one or the other direction the collar 46 will be moved thereon, transmitting movement through the links 43 to the frame $f$, moving the frame on the shaft 39 and in turn imparting movement vertically to the saw frame F through the connecting bars 42.

It will be readily noted that the provision of the pyramidal form of frame $f$ provides a structure which is light, strong, and durable and rigid, obviating the wabbling of the saw frame when in use and serving to firmly maintain said frame in any position to which the same may be set for obtaining different depths in cutting.

I have provided a supplemental work table or shelf 52 carried by the main frame of the machine and located at a point subjacent to the drill 31. It will be noted that articles to be bored may be placed on said table and by manipulating the hand wheel 50 the drill may be adjusted to the proper point for boring. Of course it will be understood that any means may be provided for feeding the work in this instance. The table is strengthened by means of a brace 53.

I have provided an improved work feeding mechanism and cut-off gage, this being illustrated to advantage in Fig. 4. The device is preferably attached to the saw table 14 and includes a laterally extending frame comprising side bars 54 and 55 and end bars 56 and 57. The frame is strengthened by a brace 58. The work feeding mechanism includes a carriage 59 having end friction rollers 60 thereon receivable in grooves 61 provided in the bars 56 and 57. A stationary angle iron or gage 62 is carried by the carriage 59 and is movable therewith. I provide means for reciprocating the carriage to feed work to the saw 30, said means including a pair of bell crank levers 63 pivoted, at 64, to the stringer or bar 55. The complemental free extremities of the bell crank levers 63 are connected by means of links 65 to the angle iron 62. The opposite extremities of said bell crank lever are connected together by means of a connecting rod 66, said rod being connected by means of a link 67 having pivotal connection with a lever 68, pivoted at 69, which in turn is connected by means of a link 70 to an operating lever 71, pivoted at 72, both of said levers 68 and 71 being pivoted on the stringer 55. It will be noted that when the lever 71 is swung on its pivot 72 that the motion thereof will be transmitted to the lever 68 through the link 70, thence to the connecting rod 66 through the link 67 and to the carriage through the bell crank lever 64 and links 65, causing the work carried by the carriage to be moved to the saw. This structure will insure straight feeding of the work to the saw since it is impossible for the frame to become skewed in the runways or grooves 61. I provide an angularly adjustable cut-off gage comprising an angle iron 73 pivoted at one extremity to the angle iron 62, as indicated at 74, the opposite extremity being connected to the angle iron by means of a bar 75 having a groove 76 therein through which an adjusting bolt 77 projects. In using the straight cut-off gage the angle cut-off gage 73 is of course not used, it being readily removed by disconnecting the same at its pivot points 74 and by removing the bolt 77.

The cut-off gage above described may be readily applied to my improved work table for cutting various angles in wood or the like. While my invention is described as being particularly adapted for wood cutting it will be readily apparent that with slight modifications the device may be adapted for use in connection with metal cutting work.

I desire to lay particular stress upon the saw carrying frame F and the manipulating mechanism therefor, it being readily apparent that the parts are of such form as to readily permit their removal or repair or replacement. This feature also insures a cheapness of manufacture. The form of driving mechanism for the saw shown in the drawings need not be adhered to when manufacturing the device but a motor of any desired type may be mounted on the frame for driving the saw. I also desire to lay particular stress on my improved cut-off gage it being noted that the parts are readily removable for repair and replacing and that the range of adjustment of the angle cutting gage is practically unlimited. A work gage 78 of any desired type may be provided on the platform 14 when my improved cut-off gage is not used.

From the above description taken in connection with the accompanying drawings it is thought that a clear and comprehensive understanding of the construction, operation and advantages of my invention may be readily gathered, and while I have shown and described the same as embodying a specific structure I desire that it be understood that I may make such changes therein which do not depart from the spirit and scope of the invention as claimed.

I claim:

1. The combination of a supporting table, stringers pivotally mounted upon said table, said stringers being in parallel relation, depending bars connected to the outer end of said stringers, a pyramidal frame mounted upon said table, said bars being pivotally connected to said pyramidal frame, whereby said bars will have a direct downward pressure directly beneath said stringers, upon said pyramidal frame, and means connected to the apex of the pyramidal frame for moving the apex of the pyramidal frame in either direction, thus causing said bars to raise or lower said stringers.

2. The combination of a supporting member, carrying means pivotally mounted upon said supporting member, a pyramidal frame pivotally mounted upon said supporting member, means connecting said pivotal carrying means to said pyramidal frame, and means for shifting said pyramidal frame and retaining the same in a set position, thus causing the pyramidal frame to equally receive and distribute supporting strain to said supporting member and said last mentioned means.

3. The combination of a supporting member, pivotal carrying means carried upon said member, the pyramidal frame pivotally mounted at one side of its base to said supporting member, means connecting the base of the pyramidal frame to said pivotal carrying means, and means connected to the apex of the pyramidal frame for shifting the same and retaining the pyramidal frame in an adjusted set position thus moving said pivotal carrying means and said pyramidal frame receiving the supporting strain and distributing the same equally upon said supporting member and also permitting said last mentioned means to easily shift the pyramidal frame.

In testimony whereof I affix my signature in presence of two witnesses.

RUPERT X. LANDOLL.

Witnesses:
J. E. HAMBURGER,
M. M. METZNER.

Copies of this patent may be obtained for five cents each, by addressing the "Commissioner of Patents, Washington, D. C."